ANTHONY R. CERULLO.
PATTERSON D. MERRILL.
INVENTOR.

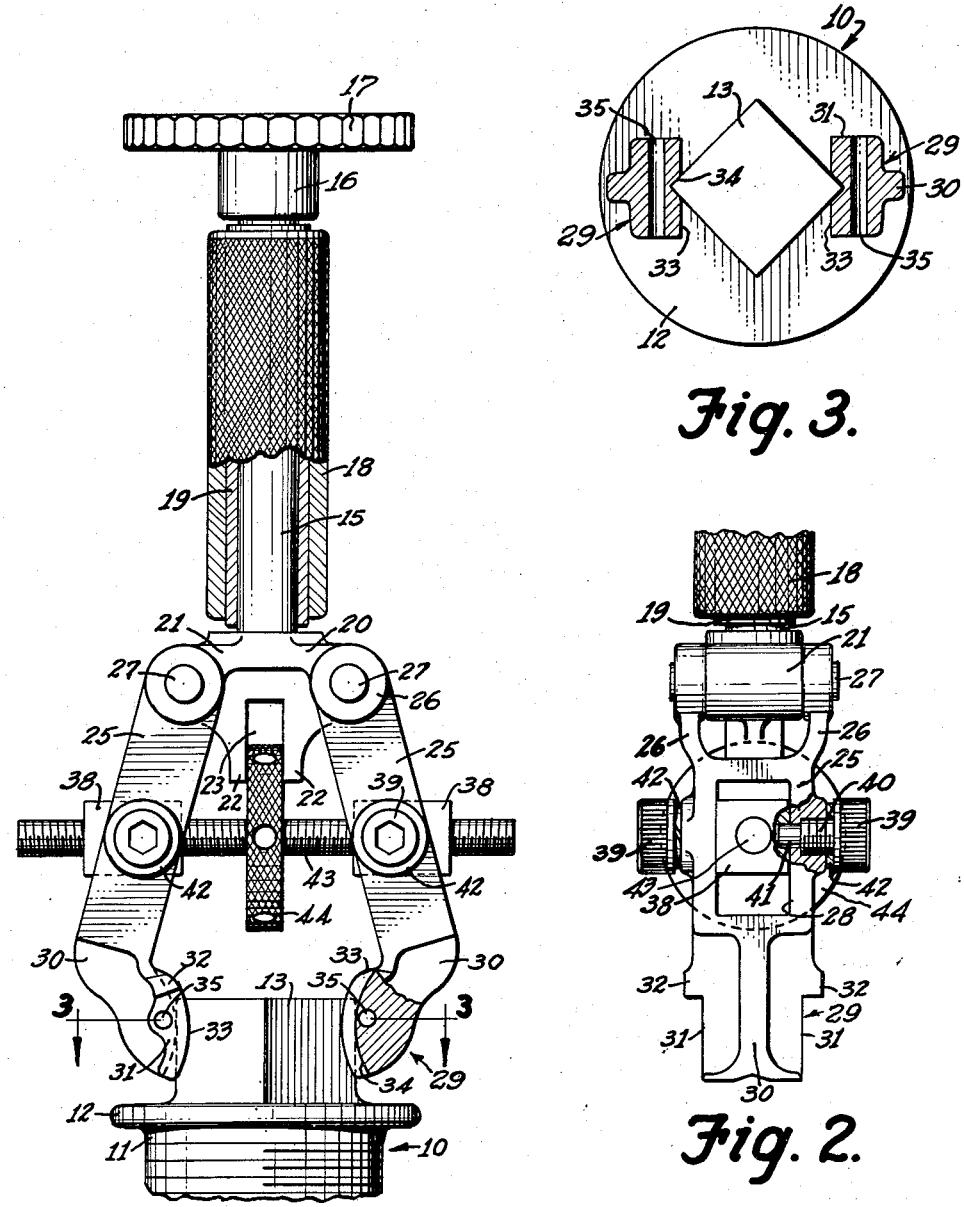

Patented Aug. 10, 1954

2,685,809

UNITED STATES PATENT OFFICE 2,685,809

GRIPPING DEVICE HAVING RELATIVELY ROTATABLE HANDGRIPS

Patterson Davy Merrill, South Bend, Ind., and Anthony R. Cerullo, Cincinnati, Ohio, assignors to M. B. Skinner Company, South Bend, Ind., a corporation of Indiana Application May 25, 1953, Serial No. 357,232

7 Claims. (Cl. 81—54)

This invention relates to improvements in gripping devices. More particularly it relates to a gripping device for inserting screw plugs and screw caps in place in fluid conduit lines or networks containing fluid at high pressure.

Fluid networks or fluid lines containing fluid at high pressure, such as lines containing illuminating gas at pressures of 40 pounds per square inch and greater, contain many service lines or branch lines, and it is sometimes necessary to disconnect a branch line, in which event a screw plug or a screw cap must be applied at the branch opening to seal the same. Such service lines or branch lines in many systems are tapped directly into the main, in which case a sealing plug is required. In cases where branch fittings are connected in the system, sealing caps are applied at disconnected branch outlets. Removal of the branch conduit must be followed rapidly by the application of the plug or cap to seal the system in order to prevent dangerously explosive conditions from occurring, due to leakage. The application of a sealing cap or plug by hand, where that action must proceed against the displacing action of a high pressure stream of leaking gas, is difficult. In some instances, such a leaking gas stream has been known to blow a plug or cap out of the user's hand. The knowledge by the user that he must work fast to avoid the occurrence of the dangerous gaseous condition, and the physical interference to performance of the work resulting from the effect of the high pressure escaping gas stream, combine to produce a difficult working condition.

It is the primary object of this invention to provide a tool which will grip a plug or a cap regardless of the size of that plug or cap within a wide range, such as a range from one-half inch to four inches, and to permit the use of both hands of the user to apply it, that is, to permit the use of one hand to properly position the plug or cap to start it in the tap bore or tap conduit, and use of the other hand to rotate the plug or cap for engaging the screw threads thereof with those of the tap bore or tap conduit.

A further object is to provide a device of this character having a novel jaw construction which is so curved and grooved as to grip plugs of a wide range of sizes, with the curved surfaces of the jaws extending tangent to the plug member in all sizes and thus effecting the necessary grip when the tips of the jaws engage the plug surfaces.

A futher object is to provide a device of this character having a pair of shiftable jaws interconnected by adjusting means, wherein the adjusting means includes a part held against lateral displacement so as to orient the two jaws in all adjustments in equiangular relation to a hand grip so as to maintain accurate positioning of a work piece relative to the hand grip.

A further object is to provide a device of this character having a rotatable hand grip associated with a knob with respect to which it rotates, the same being mounted upon a frame to which a pair of gripping jaws are connected, said gripping jaws being held in selected spaced relation by adjustable spacer means, including a part which is oriented with relation to the frame in a manner to provide stability of positioning of the jaws.

A further object is to provide a device of this character having a pair of adjustable jaws having curved work-engaging surfaces and each mounting a secondary jaw in a pivotal manner adjacent to the curved surfaces of the first named jaws so that said supplemental jaws may assume positions in a common plane in a number of different adjustments of the primary jaws and in a manner to permit the secondary jaws to clamp therebetween a circular member, such as a sealing cap.

A further object is to provide a device of this character having a pair of spaced adjustable jaws, each mounting a secondary jaw pivoted thereto to swing in an arc between selected limits.

Other objects will be apparent from the following specification.

In the drawings:

Fig. 1 is a side view of the device with parts shown in section, the same being illustrated in the adjustment or position thereof operative to clamp a screw plug;

Fig. 2 is a view of a part only of the device as viewed from the right in Fig. 1;

Fig. 3 is a fragmentary detail sectional view taken on line 3—3 of Fig. 1;

Figure 4:
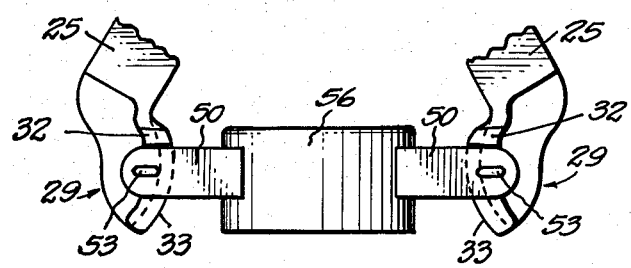
Fig. 4 is a fragmentary view illustrating the jaws of the device mounting secondary jaws to clamp therebetween a circular member such as a screw cap.

Referring to the drawings, and particularly to Figs. 1, 2 and 3 which illustrate the device as used for the purpose of gripping a pipe sealing plug, the numeral 10 designates a plug having a screw-threaded portion 11, an enlarged flange 12 concentric therewith, and a squared or non-circular end portion 13. Plugs of this character are well known in the art and are used by inserting the same in a tapped opening of a conduit or the like for sealing purposes.

Our improved device comprises a shaft 15 of circular cross-section, to one end of which is fixed the sleeve 16 of an enlarged hand grip or knob portion 17. A sleeve 18 encircles a portion of the shaft 15, the same preferably being lined with a cylindrical bearing 19 to accommodate rotation of the member 18 relative to the shaft 15.

The shaft 15 mounts a frame member 20 at the end thereof opposite the hand wheel 17. This frame has a pair of laterally projecting knuckle portions 21 and a depending bifurcated portion 22 defining a slot 23 aligned with the axis of the shaft 15.

A pair of similar arms 25 have bifurcated end portions 26 spaced apart a distance substantially equal to the length of the knuckles 21 and pivoted thereto by means of pivot pins 27. The arms 25 are elongated and have formed therein intermediate their length elongated slots or apertures 28. The arms 25 terminate in jaw portions 29 which are suitably ribbed or reinforced at 30, and which are characterized by flat opposed substantially parallel side surfaces 31 for the major portion of their length. Laterally projecting ears 32 are formed spaced from the tips of the jaws. The jaws are provided with inset convexly curved inner surfaces 33 and the ears 32 are formed at the upper ends of those curved inset portions 33. Each of the curved inset portions or surfaces 33 is interrupted by an elongated V groove 34 which extends from end to end of the surface 33, as best seen at the right in Fig. 1. Each of the jaws has an aperture 35 extending transversely therethrough and open at surfaces 31.

Blocks or nut members 38 are mounted in the elongated apertures of the arms 25 and are pivotally connected thereto by pivot members 39. The pivot members 39, as best illustrated in Fig. 2, may constitute members having screw-threaded shanks 40 which are anchored in screw-threaded bores in the arms 25 and which have projecting therefrom reduced unthreaded pivot members 41 extending into apertures in the blocks 38 to permit the same to rotate. The screw-threaded members will preferably have enlarged heads, and lock washers 42 may be interposed between such heads and the surfaces of the adjacent portion of the frame 25 to hold the pivot members against release from the arms. Each of the block or nut members 38 has a central screw-threaded bore in which is threadedly engaged one end of a screw-threaded member 43 having a double screw-thread or lead. At its center the screw-threaded member 43 has fixed thereto an enlarged disk 44 which may be knurled peripherally and which is of such a diameter that it extends into the slot 23 of the frame 20 with a snug fit.

When it is desired to use the device for gripping a plug 10, the disk 44 is manipulated to space the jaw portions at the ends of the arms a distance to permit the squared end 13 of the plug to be inserted therebetween. Thereupon the member 44 is rotated in tightening direction to cause the jaws to engage the plug portion 13 with diametrically opposed corner portions thereof fitting in the grooves 34 of the opposite jaws. The plugs employed may be any of a wide range of sizes, for example, sizes from one-half inch to four inches, and their use and proper anchorage between the jaws is facilitated by reason of the elongation of the grooves 34 and the convex curvature at 33 of the inner surfaces of the jaws. Consequently, the flat surfaces of the plug end 13 will extend at a tangent to the jaws intermediate the opposite ends of the convex curvature thereof, and an effective gripping action is secured upon the plug portion 13 by the jaws. When the disk 44 has been manipulated to firmly clamp the plug between the jaws, the device with the plug gripped thereby will constitute one rigid unit and may be manipulated as such. The gripping of the plug in this manner will preferably occur prior to the operation of disconnecting the branch from the main at which the plug is to be inserted.

In using the device for the purpose of inserting a plug in the branch opening, the user secures a firm grip at the sleeve 18 with one hand and grasps the knob portion 17 with his other hand. The device is then applied to the work, that is, the threaded end portion 11 of the plug is centered with respect to the tapped opening into which the plug is to be fitted, and the grip of one hand upon the sleeve 18 enables the user firmly to position the plug in the proper centered relation to said opening. The other hand of the user which grasps the knob 17 may rotate that knob for the purpose of engaging the threads of the part 11 of the plug 10 with the threads of the hole in which the same is to fit. Thus it will be plain that the user has the full use of one hand to position the plug against the distracting influence or displacing forces resulting from the escaping gas. The other hand of the user is free to manipulate the plug when so positioned for the purpose of effecting starting of the threads of the plug into engagement with the threads of the bore. Because the user is given the opportunity to use both hands, the work of applying the plug may proceed expeditiously, accurately and rapidly, and false starts and distractions due to displacement of the plug by gas pressure are reduced to a minimum. Furthermore, it will be apparent that the seating of the plug to fully sealed position can proceed rapidly because the user may spin the knob 17 while holding the sleeve 18. Such rotation and manipulation of a plug to fully seat it in sealed position can proceed much more rapidly than ordinarily is possible by the use of wrenches. It will be understood, of course, that the force which can be exerted by the device is limited to that which the user can exert upon the knob 17, so that when the user has threaded the plug into place as far as is possible by the use of this device, a finishing tightening action will be required by the use of a wrench which will enable greater torque to be exerted. At this time, however, substantially all leakage of gas at the opening will be stopped by the positioning of the plug, and the danger caused by leaking gas will thereby be minimized if not completely overcome.

One of the important features of this device is that it may be used in places where only slight clearance is provided for manipulating purposes. Thus it is not necessary that the device be used in places having large access openings, but, instead, the device may be used in locations where access thereto is limited. It will be apparent from a consideration of the device that the arms 25 may swing relative to the pivots 27 only to coincide with the adjustment effected by the rotation of the disk 44 and the screw thread member 43. Thus undesired swinging of the arms 25 is pre-

Figure 5:
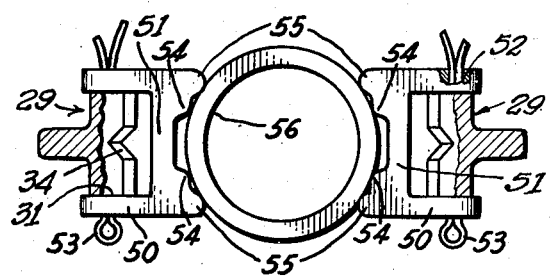
Fig. 5 is a bottom or end view of the device illustrated in Fig. 4.

[...] seating of the disk 44 in the groove. This renders the device [...] so [...] is constructed sturdily as [...] large [...] effective in use when [...] fluid pres-
[...] under conditions opp[...]
In instances where[...]red to apply a cap [...] to seal that conduit, as [...] the end of a [...]as previously been joined to [...] a branch fitting and is being dis- when a branch [...] the branch line removed, the de- that condu[...] and vi[...] be equipped with secondary jaw mem- as illustrated in Figs. 4 and 5. These secondary jaw members are essentially of H-shape, as best seen in Fig. 5, having opposite side portions 50 and a central web 51. The spacing of the inner surfaces of the side portions 50 will be such as to span the jaws and permit them to confront the jaw surfaces 31. Apertures 52 are formed in one end of the side parts 50 so as to receive a securing member, such as a cotterpin 53, which passes therethrough and through the apertures 35 in the jaws of the device. In this arrangement the members 50 are permitted to swing about the cotterpin or other securing member 53 as a center. It will be observed by referring to Fig. 1 that the aperture 35 is spaced closer to the convex curved face 33 of the jaws than the center about which those jaw faces 33 are evolved. Consequently, the arc of rotation of the member 50 will be such that, even though the cross-member 51 has clearance with the jaws in some intermediate position as illustrated in Fig. 5, nevertheless as the jaw members approach the opposite ends of the curved surfaces 33, the cross-member 51 will be brought into engagement with jaw surfaces 33. Also, the ears 32 will serve as means to limit the swinging of the members 50 in one direction. The outer or free portions of the supplemental jaws are preferably of the configuration illustrated in Fig. 5, having steps or shoulders 54 in addition to tip portions 55. This arrangement makes possible the receipt of cap members 56 of a wide range of sizes, it being apparent that cap members 56 of small size can be gripped at the shoulders 54 rather than solely at diametrically opposed central webs 51. In other words, even though the cap is of small size, four points of pressure contact for gripping thereof are provided, so that the cap is held firmly and securely. Where the cap is of larger size, it will be gripped at the tip members 55, the same again providing four different points of support or connection, rather than simply two points of connection. It will be apparent that four spaced points of grips upon a circular member provides stability which a gripping action at two diametrically opposed points lacks.

Inasmuch as the members 50 are free to rotate through a substantial angular range about the pivot axes 53, said members are free to orient themselves properly to grip the member 56. Thus once initial contact is made between supplementary jaws and the cap member 56 on opposite sides thereof, the cap member serves to move or swing those supplemental jaw members 50 into substantial alignment and thereafter continued tightening action serves to maintain and lock those jaw members in that adjustment or relation. When such a tight grip is effected, the device as a whole is rendered sturdy and stable, so that manipulation of the cap to apply it to the end of a pipe or fitting from which gas escapes at high pressure may proceed expeditiously and in substantially the same manner described above. Thus, although the arms or jaws 50 are pivoted at 53, they are steadied by the cap members 56 which they grip so that the structure is totally free from undesired play or looseness of the parts.

The members 53, by means of which the supplemental jaws 50 are attached to the main jaws or arms 25, will preferably be members which are readily detached or removed. Thus, although they are shown here as cotterpins, they may be simple pins or rods or bolts or any other member which will serve as a pivot for the supplemental jaws, which will hold them firmly anchored against the application of pressure when a cap 56 is gripped, and which at the same time are readily removable so that the supplemental jaws may be removed when it is desired to convert the device from one for gripping caps to one for gripping the screw-threaded plugs.

While the preferred embodiment of the invention has been illustrated and described herein, it will be understood that changes in the construction may be made within the scope of the appended claims, and we do not intend to be limited to any structure as herein specifically shown, but, instead, to rely upon the scope and breadth of the claims.

We claim:
1. A gripping device adapted for use in mounting a threaded sealing member at a tapped branch opening of a conduit system containing fluid under pressure, comprising a pair of relatively rotatable hand grips, a pair of adjustable jaws carried by one hand grip, and means for adjusting said jaws to spread and retract them, said jaws including terminal portions having confronting curved work-engaging surfaces interrupted by grooves extending longitudinally relative to said jaws.

2. A gripping device as defined in claim 1, wherein one of said hand grips constitutes a sleeve and the other hand grip constitutes a shaft rotatably encircled by said sleeve and an enlarged terminal grip portion.

3. A gripping device as defined in claim 1, wherein said jaws are pivoted to a hand grip having a guide portion, said adjusting means having a part oriented by said guide portion.

4. A gripping device as defined in claim 1, wherein said jaw mounting hand grip includes a laterally enlarged frame portion having a central slot therein, said jaws being pivoted to said frame portion at opposite sides of said slot, said adjusting means including a threaded shaft having an enlargement fitting in said slot.

5. A gripping device adapted for use in mounting a threaded sealing member at a tapped branch opening of a conduit system containing fluid under pressure, comprising a pair of relatively rotatable hand grips, a pair of adjustable jaws carried by one hand grip, and means for adjusting said jaws to spread and retract them, said jaws including terminal portions having inwardly offset longitudinally convexly curved confronting faces each interrupted by a longitudinal groove.

6. A gripping device adapted for use in mounting a threaded sealing member at an opening in a conduit system containing gas under pressure, comprising a pair of relatively rotatable hand grips, a pair of adjustably spaced members carried by one hand grip, means for adjusting said members, and a jaw pivoted to the outer portion of each member and extending laterally therefrom, said jaws pivoting between predetermined limits.

7. A gripping device adapted for use in mounting a threaded sealing member at an opening in a conduit system containing gas under pressure, comprising a pair of relatively rotatable hand grips, a pair of adjustably spaced members carried by one hand grip, means for adjusting said members, and a jaw pivoted to the outer portion of each member and extending laterally therefrom, said jaws being of substantially H-shape with the free work-engaging end thereof having a stepped configuration.

References Cited in the file of this patent

UNITED STATES PATENTS

| Number | Name | Date |
|---|---|---|
| 795,434 | — | July 25, 1905 |
| 2,323,774 | Ja— | July 6, 1943 |
| 2,435,346 | Ghigli— | — |
| 2,573,972 | Holland | — |